United States Patent [19]
Davies et al.

[11] Patent Number: 5,678,423
[45] Date of Patent: Oct. 21, 1997

[54] METHOD FOR REMOVING AND RECOVERING VOLATILE ORGANIC COMPONENTS

[75] Inventors: Simon Davies, Nærsnes; Niels Henrik Hasting, Borgen, both of Norway; Lance Hays, La Crescenta, Calif.

[73] Assignee: Kvaerner Process System A.S., Billingstad, Norway

[21] Appl. No.: 434,240

[22] Filed: May 4, 1995

[30] Foreign Application Priority Data

May 6, 1994 [NO] Norway .................................. 941704

[51] Int. Cl.⁶ ............................................ F25J 3/00
[52] U.S. Cl. ........................... 62/613; 62/632; 62/634
[58] Field of Search ............................ 62/17, 20, 613, 62/632, 634

[56] References Cited

U.S. PATENT DOCUMENTS

| | | |
|---|---|---|
| 3,292,380 | 12/1966 | Bucklin ............................ 62/20 |
| 3,714,790 | 2/1973 | Battey . |
| 3,894,942 | 7/1975 | Mair ........................... 62/20 X |
| 4,273,562 | 6/1981 | Niskanen . |
| 4,680,042 | 7/1987 | Mehra ......................... 62/20 X |
| 4,948,394 | 8/1990 | Rojey . |
| 5,076,822 | 12/1991 | Hewitt . |
| 5,176,002 | 1/1993 | O'Brien et al. . |
| 5,315,832 | 5/1994 | Hopewell . |

FOREIGN PATENT DOCUMENTS

| | | |
|---|---|---|
| 247 585 A1 | 12/1987 | European Pat. Off. . |
| B 175 290 | 6/1994 | Norway . |

Primary Examiner—Christopher Kilner
Attorney, Agent, or Firm—Jacobson, Price, Holman & Stern, PLLC

[57] ABSTRACT

A method for the recovery of volatile organic components (VOC) released when loading liquid hydrocarbons into a storage or cargo tank, is described. The VOCs issuing from the tank are compressed, and injected into a sidestream taken from the main hydrocarbon stream, which is cooled and used as the absorbing medium, and is conducted to a VOC recovery unit comprising at least a bi-phase rotary separator turbine (BRST). In the BRST the VOC-containing gas is substantially separated into a VOC component and inert gas. The inert gas is vented to the atmosphere. The VOC component or VOC-enriched liquid stream is then returned to the main cargo stream or a cargo tank. Any methane contained in the volatile gases issuing from the cargo tank, instead of being vented to the atmosphere, is recovered or a catalytic process is used to convert methane to carbon dioxide and water for discharge to the atmosphere. The system is particularly intended for the offshore loading of oil into tankers.

3 Claims, 6 Drawing Sheets

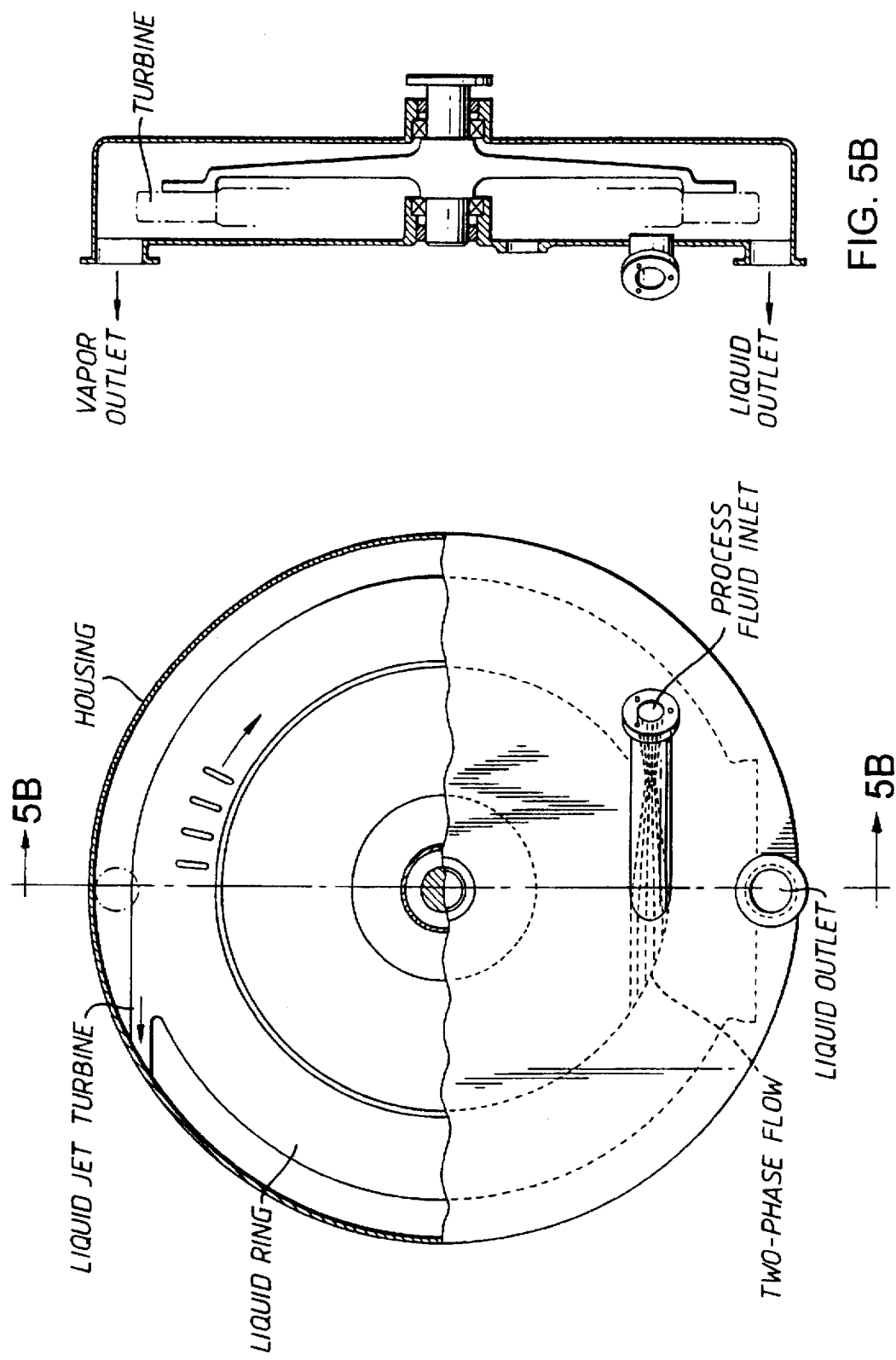

METHOD FOR REMOVING AND RECOVERING VOLATILE ORGANIC COMPONENTS

BACKGROUND OF THE INVENTION

The present invention relates to the recovery of volatile organic components (VOCs) which are lost when loading hydrocarbons into a tank open to the atmosphere.

In one aspect the invention relates to the recovery of VOCs when loading crude oil into oil tankers.

In yet another aspect, it relates to the recovery of VOCs during offshore loading of crude oil into tankers via a loading buoy.

When liquid hydrocarbon streams such as product streams or crude oil streams are transferred into storage tanks or loaded into product or crude oil tankers for further transportation, part of the cargo, the so-called volatile organic compounds, is being lost to the atmosphere. The proportion of such losses based on the total amount of hydrocarbons being transferred (leading or unloading) varies, depending on the composition of the VOCs, their concentration in the liquid hydrocarbon stream, the temperature and the relative motion of the oil in the tank at the site of loading/unloading etc. In the case of offshore oil loading into tankers on the Norwegian Continental Shelf, to which problem the present invention in particularly is addressed, it represents a loss of some 100 000 tons of VOC per year, corresponding to $1/1000$ of the total cargo loaded per year. (1992 figures). The VOCs dissolved in the crude oil stream in this case consists mainly of ethane, propane and butane. Methane is also present to approx. 10% of the total VOCs, but is not normally counted among the VOCs, although the recovery of this component would clearly also be beneficial. Since for safety reasons loading of crude oil into tankers nowadays nearly always is carried out under a blanket of inert gas ($N_2$, $CO_2$, etc.), this gas too is forced out of the cargo hold along with the volatile organic components, as the crude oil is being loaded to the tank.

The economic losses incurred when valuable raw materials such as VOCs are being lost to the atmosphere in this matter is presently estimated at 10 million USD per annum on the Norwegian Shelf alone. Apart from the economic aspect of this uptil now wasteful operation, there is another aspect; environmental concern.

The compounds making up VOCs, all have the ability to react with nitrogen oxides in strong sunlight which in turn may result in increased concentrations of ozone at or near the earth's surface. The harmful effects of ozone on the health of humans and animals, trees and other vegetation is well known. Several international agreements have ben signed with the view to reducing the mount of VOCs released to the atmosphere. For example, Norway and several other major industrial countries have committed themselves to reducing the VOC emissions by 30% by the year 2000, based on the 1989 levels. An investigation has shown that in Norway's case, more than 40% of the country's total VOC emissions are caused by crude oil loading, The target is therefore to reduce emissions from these sources by 70%.

Major operators have for some time endeavored to reduce the discharge of volatile gas compounds from offshore loading. A reduction of 15% has in fact already been achieved on the Norwegian Shelf by the following simple modification and operating procedures:
The loading rate in each tank is increased
The temperature of the oil to be loaded is as low as possible
Minimum crude oil washing is applied after unloading.

For new ships, the cargo tank sizes have been modified resulting in the same width of the wing tanks as for the centre tank. Swash bulkheads in the cargo tanks may be introduced.

The complex transfer arrangement between the platform and the tanker via the loading house, the loading buoy with swivels and the subsea pipeline makes return of gas to the production facilities too complicated and expensive to be considered a realistic alternative. Work has therefore been concentrated on VOC recovery systems located onshore and/or on board the tanker.

The economic aspects of recovering VOCs and/or methane from the crude oil stream being loaded into a tanker may or may not be attractive, depending on the fluctuations of the oil price. In recent years there have been times when the investments that are after all needed in order to recover $1/1000$ the amount of the crude cargo in the form of VOC have seemed too high and then again, in years with good oil prices, a reasonable return on investment can be foreseen. Recently the environmental/political aspect of these relatively large and harmful emissions right here in our backyard have started to weigh more heavily, so that the economics is no longer the only consideration. Nevertheless, since comprehensive VOC recovery for economic reasons has thought to represent a more or less doubtful proposition, not many references to practical and workable equipment/systems for the recovery of VOCs, in particular when loading into large tanks, especially when loading crude oil into makers via offshore systems, can be found in the patent literature or elsewhere.

U.S. Pat. No. 3,714,790 discloses a method and equipment for the recovery of vapour being liberated when a tank is filled with a volatile liquid- The vapour which will be mixed with air is compressed and conducted in absorbing contact with cooled liquid in a condensation column where the pressure is 2–5 atm. The absorption liquid is the same liquid which releases the vapour. In the condensation column the air is not absorbed and is conducted out to the atmosphere. The liquid saturated with vapour is conducted back to the storage tank.

In U.S. Pat. No. 5,076,822 vapour is conducted in contact with a cooled liquid stream in an absorption column.

In Norwegian patent application 920726 the tank is filled with inert gas and hydrocarbon vapour and this mixer is compressed and conducted through a static mixer. The same liquid which releases the vapour is conducted to the static mixer from sit outlet on the cargo leading line. From the static mixer the mixture is conducted to a cyclon separator where liquid saturated with vapour is separated from and conducted back to the rank via a return pipeline with an adiabatic nozzle. In the cyclon separator inert gas is separated out along with any other gases with low boiling point. The gas mixture is conducted to a membrane filter which separates the gas. The inert gas is released to the atmosphere and gases with a low boiling point are returned to the compressor. According to the invention VOCs, methane and inert gases which previously were driven off and allowed to escape to the atmosphere, are now conducted through a compressor where they are compressed, preferably to a maximum of 10–15 atm. Part of the crude off being loaded into the cargo tank, for example 5–20 percent, preferably about 10 percent by volume, is withdrawn from the main crude oil stream and conducted to a pump to increase its pressure, also preferably to a maximum pressure of about 10–15 bar. The two separate and distinct streams, i.e. the liquid crude oil sidestream and the gaseous VOC-laden inert gas are then conducted to a VOC recovery unit in the form of a gas/liquid absorption unit with the crude oil sidestream serving as the absorbing liquid and the VOC-laden inert gas being absorbed therein.

SUMMARY OF THE INVENTION

It is an object of the invention to provide a system for the recovery of VOCs from the gases issuing from a cargo tank when the tank is being filled with hydrocarbons.

It is also an object of the invention to provide a system for absorption of VOCs into a stream of hydrocarbons for subsequent return to the main cargo volume. It is a further object to provide a VOC recovery process as outlined above, in which the mount of energy used for the recovery process is at a minimum, mainly became of the choice of certain vital process components.

It is a still further object to provide such VOC recovery system suitable for use onboard e.g. shuttle tankers loading crude oil from offshore loading buoys. In such cases it is a requirement that the process equipment should occupy a minimum of space, and be as little cumbersome as possible.

These and other objectives and advantages of the present invention are achieved by the features stated in the patent claims.

BRIEF DESCRIPTION OF DRAWINGS

The preferred embodiments of the invention will now be described in greater detail with reference to the drawings, in which:

FIG. 5 illustrates the biphase reaction turbine concept according to the present invention.

DESCRIPTION OF PREFERRED EMBODIMENTS

Figure 1:
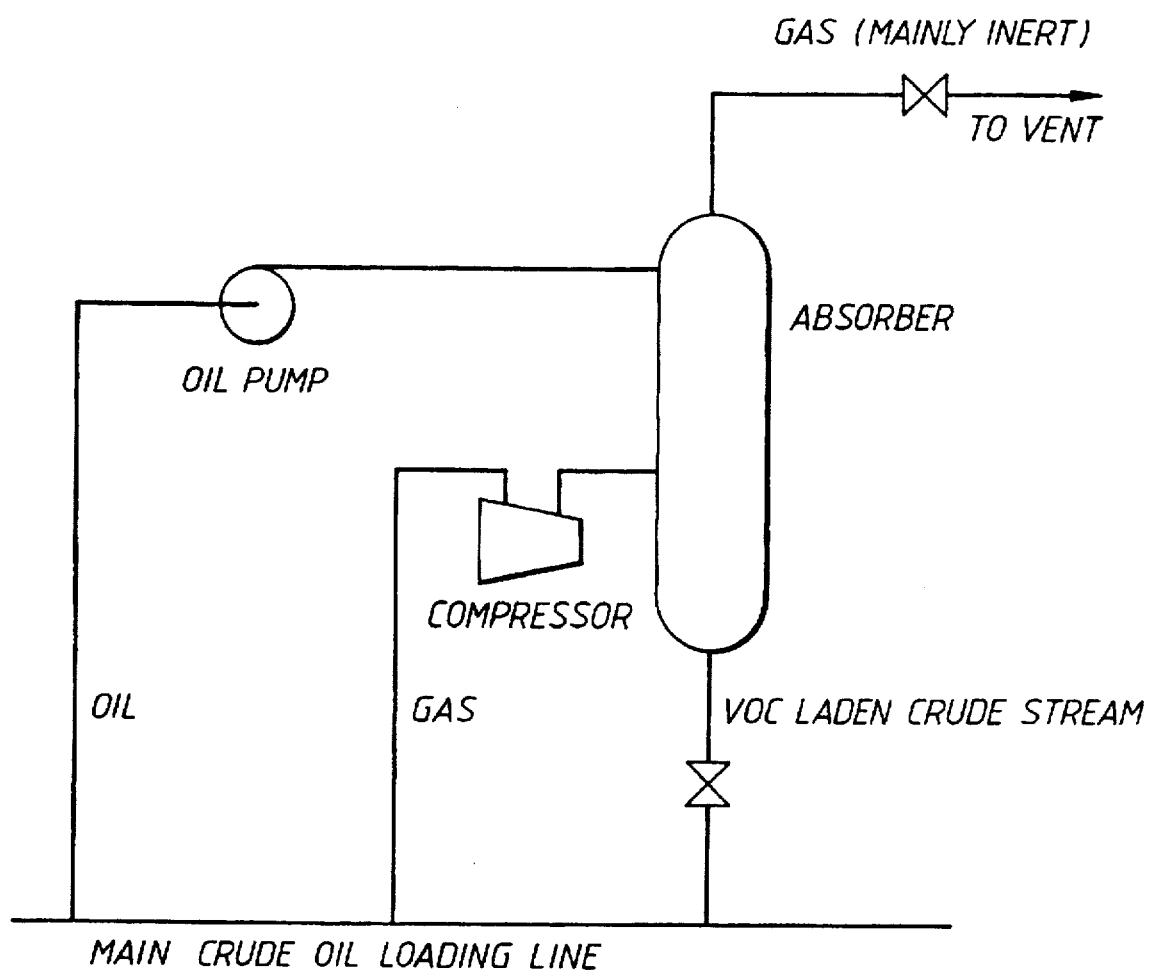
FIG. 1 is a diagram showing a VOC-recovery system according to the prior art.

FIG. 1 shows how a VOC recovery could be designed, based on conventional technology. VOC-gas is compressed in a compressor and fed to the bottom of an absorption column. A sidestream of hydrocarbon, e.g. crude off from the main crude oil stream going to the cargo tank is taken off, pumped via a heat exchanger coil cooler and fed to the top of the absorption column to serve as an absorbing liquid for the compressed VOCs. At the top of the absorber, inert gases are released. At the bottom of the absorber, the crude off side stream now laden with VOC absorbed therein, is discharged to the cargo tank through an expansion valve.

Figure 2A:
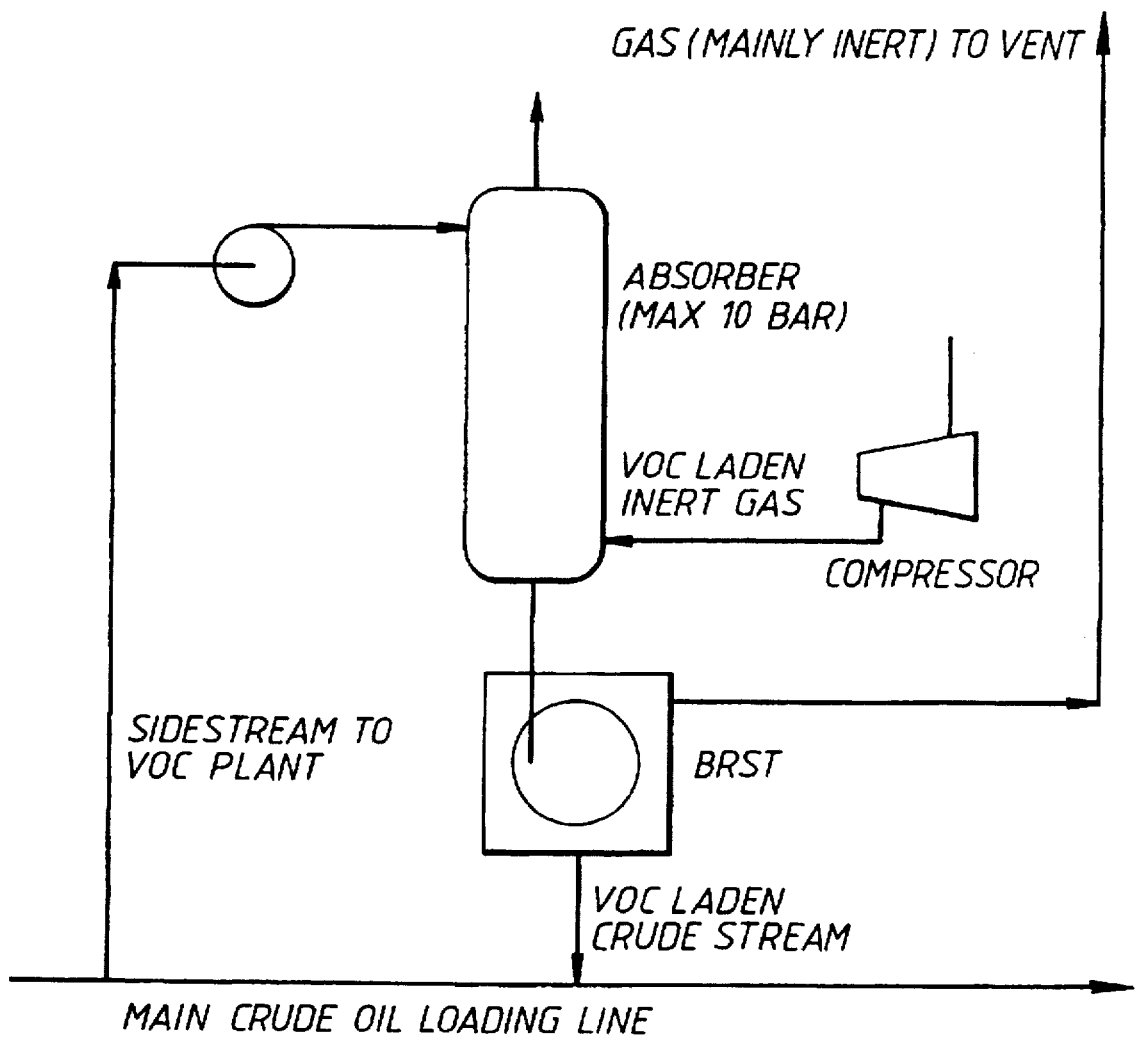
FIG. 2A is a diagram showing a VOC-recovery system wherein a BRST is used in combination with an absorption column.
Figure 2B:
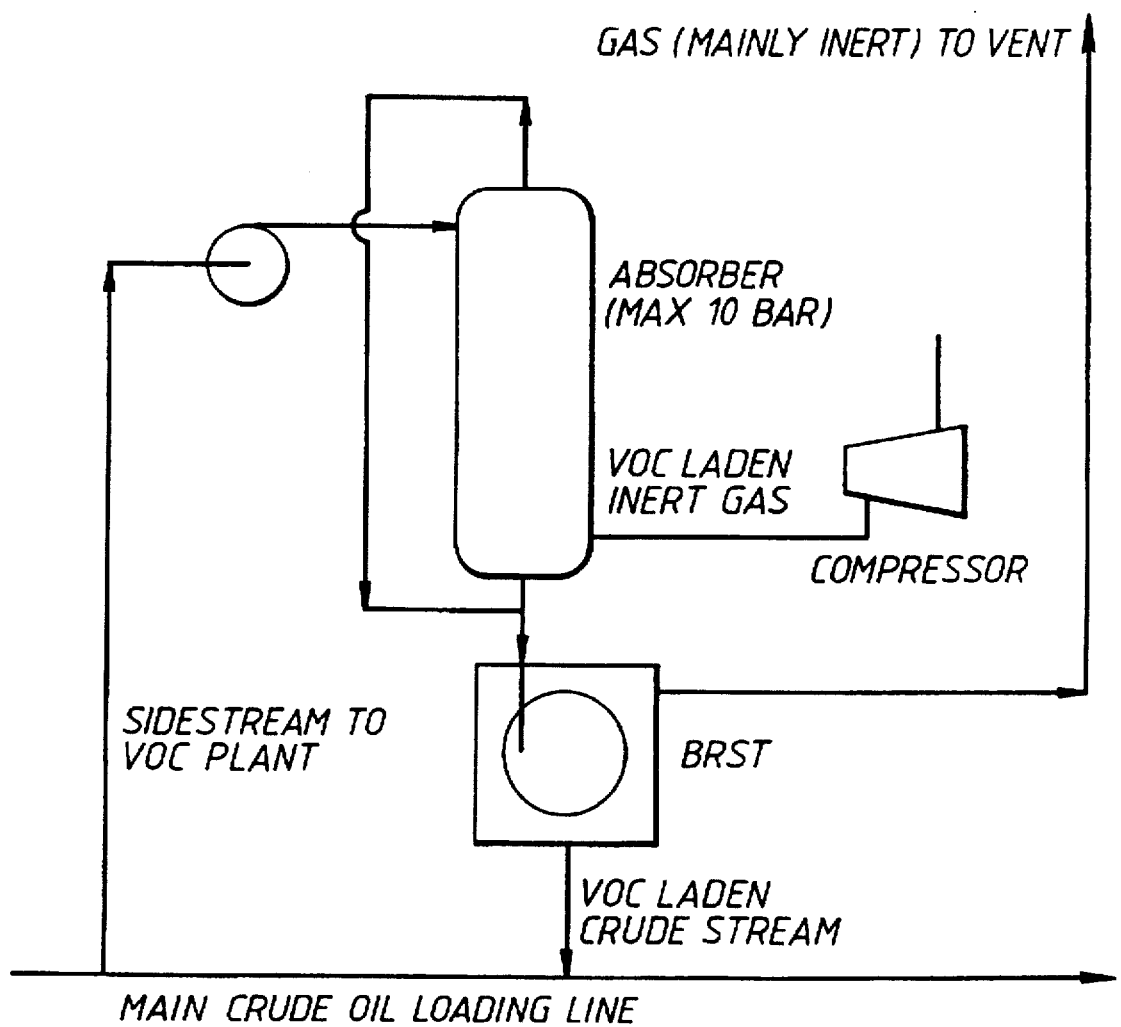
FIG. 2B is a diagram showing a variation of the VOC-recovery system illustrated in FIG. 2A.

FIG. 2A is essentially the same arrangement as FIG. 1, with compressed VOC being absorbed in a crude oil side stream in an absorber. However, several advantages in relation to the method using conventional equipment is obtained by the method of the invention shown in FIG. 2A, by the use of a rotary separator turbine such as a Biphase Rotary Separator Turbine (BRST) in which the pressure of the VOC-laden crude stream is gently reduced, so as to facilitate acceptance of this stream in the main cargo stream, without immediate evolution of VOC once again, which has been a problem with the use of conventional equipment. The BRST also recovers a substantial part of the energy contained in the VOC-laden stream exiting the absorber. FIG. 2B, a variant of FIG. 2A, shows how even more energy can be extracted, if required, by also conducting the stream of inert gas, normally discharged from the top of the absorption column, to the BRST inlet before finally discharging it to the atmosphere.

Figure 3:
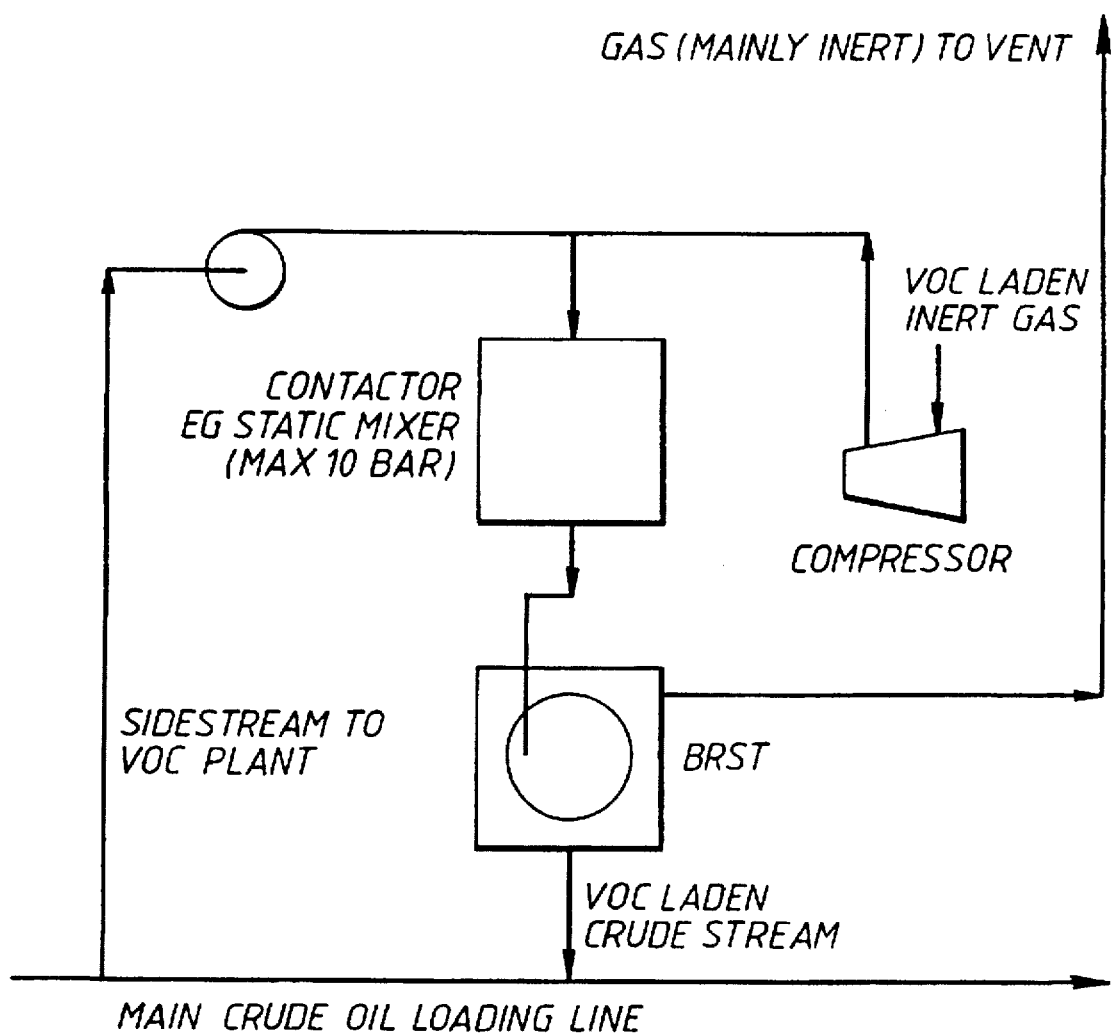
FIG. 3 is a diagram showing a VOC-recovery system according to the present invention.

In FIG. 3 the absorption column has now been replaced by another absorption means, i.e. a liquid gas contactor, e.g. in the form of a static mixer. As in the arrangement of FIG. 2B, the maximum amount of energy is recovered by the arrangement of FIG. 3, in that the inert gas is passed through the BRST before being released to the atmosphere.

Figure 4:
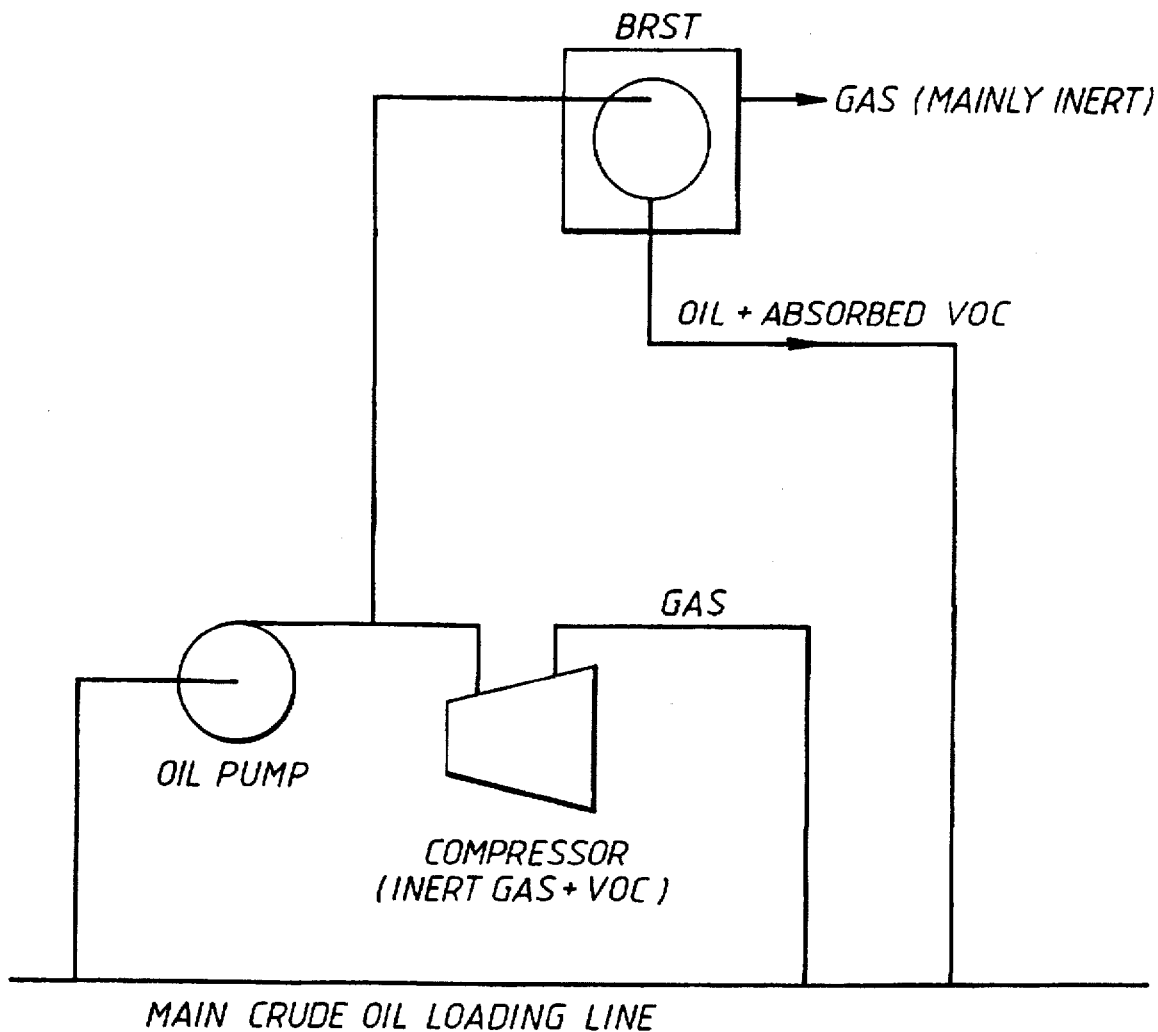
FIG. 4 is a diagram showing a compact VOC-recovery system according to the present invention.

FIG. 4 is a simpler, more compact VOC-recovery system wherein the BRST itself is first used as the oil and gas absorption unit and then, after having given up energy in the turbine, inert gas is vented to the atmosphere, and crude off contain_jug VOCs is returned to the main cargo tank.

In FIG. 5 the BRST concept is illustrated. Although on the drawing only one absorption nozzle, for the sake of simplicity, is shown, it should be clear that several such nozzles can be used in each turbine.

The method according to the invention, with the equipment described above, provides a major step forward in the effort to recover all or part of the volatile organic compounds issuing from a cargo tank when it is being filled with hydrocarbons. The system is particularly intended for loading of oil into tankers at landbased or offshore loading terminals. Especially in the later case the vessel itself is really the only place where additional equipment for VOC recovery can be installed. It is thus very important that whatever equipment is installed is as compact as possible, and gives as problem-free operation as possible. In the light of this, it becomes apparent why the inventors have put emphasis on obviating the need for a conventional absorption column. Such a column (FIGS. 1, 2A, 2B) will have a height of 8–10 m in the upright position in which it will be used and a diameter of approx. 2.5 m. Apart from the extra space occupied by this equipment, its operation may be cumbersome, especially in high seas.

The alternative systems as represented by FIGS. 3 and 4, i.e. without an absorption tower, offers numerous advantages. The absorption in this case of VOC into the crude oil stream, is conducted, equally efficiently, in different types of apparatus, viz. a gas/liquid contactor of which several commercially available types could be used, and the resulting stream of inert gas and VOC absorbed in crude oil is passed through a BRST (FIG. 3). An even more sophisticated approach is shown in FIG. 4, in which the BRST is made to do the whole job of (a) absorbing the VOC into the crude oil sidestream, (b) separating the inert gases therefrom and discharging same to the atmosphere, or alternatively for recovery of any methane contained therein, and (c) relaxation of pressure of the VOC-laden crude oil sidestream, so that it is readily accepted for reentry to the main cargo stream without causing significant loss of VOC therefrom.

As with all other cases where the BRST is used, the turbine will recover a significant part of the energy contained in the stream of crude oil VOC and/or inerts, and this power can be immediately utilized for several purposes onboard the vessel. This reduces the overall power requirements of the VOC recovery system, an important feature, since ships as a rule have very little surplus power available.

The BRST also helps in providing an efficient separation whereby foaming is minimized, after the absorption and after the depressurization steps.

A static mixer should provide a compact alternative to a conventional absorption column, but then a subsequent separator must be found which is itself compact and which breaks down foams.

Hydrocyclones are compact but suffer from foaming problems, and thus do not separate the oil and water efficiently. Alternatively a (large) separator column/vessel with internals will break down foams, but is big, i.e. one might as well go back to using an absorption column. The BRS turbine is both compact and minimizes foaming. It gives efficient separation.

It should be understood that in the case where one VOC-recovery unit of standard size is not sufficient to accommodate the capacity demand, two or more units, in fact ms many as necessary, can be installed and mu simultaneously, to satisfy the demand.

One of the most gratifying aspects of the method according to the invention is that it reduces or eliminates completely the amount of foaming in the crude oil tank at the point where the VOC-laden stream is reintroduced to the main cargo stream or the main cargo tank. When passing the VOC-laden stream through the BSRT instead of a conventional pressure reducing valve, a more even pressure reduction is obtained, compared with the conventional valve in which the pressure is first taken down to a minimum value before being raised again to the final exit value, when the VOC-laden oil stream is discharged to the main crude oil stream or cargo tank.

Central to the concept of efficient recovery of VOC (and energy) from the VOC-laden crude oil stream is the BRST. The BRST is a relatively new turbine which operates with liquid/gas mixtures. The BRST is a simple, compact unit which produces shaft power, separates the gas and liquid, and pressurizes the liquid effluent. For many applications this unit can replace the combination of a letdown valve, separation tank, knockout dram, and pump. In a conventional system, the two-phase energy is dissipated in a valve. By substituting the BRST, however, net power can be produced. In addition, improved separation can be achieved with this compact unit, even with the presence of foams and entrained solids.

Biphase Energy Co., a subsidiary of Douglas Energy Co., has been developing the BRST since 1976. These turbines have been operated with many two-phase fluid combinations including crude oil/gas, brine/steam, water/steam, oil/steam, Selexol/CO$_2$ and water/air. Commercial units are manufactured by major rotating machinery manufacturers to the design and specifications of Biphase. Developmental units are manufactured and tested at Biphase Energy Co. in Placentia, Calif. Proven turbine design and manufacturing practice is used to produce these machines.

For many gas/liquid separations the compact size of the Biphase turbine is very valuable. A Biphase turbine has been built to process 100,000 barrels per day for oil/gas off-shore production. It was successfully demonstrated with air/water mixtures. This unit has a footprint of only 3'×6'. It can replace a separation tank with a footprint of 14'×50'. An enormous cost savings in platform construction is possible.

The Biphase turbine for process applications has two main components: (1) a two-phase nozzle and (2) a rotary separator reaction rotor. The relationship of the nozzle and rotor are illustrated in FIG. 5.

The two-phase nozzle converts the thermal and pressure energy of a liquid and gas mixture to fluid kinetic energy. In the nozzle, the mixture is expanded from high inlet pressure to low exit pressure with the gas and liquid droplets intimately mixed. The expanding gas transfers momentum to the liquid droplets (much in the same manner as it would to turbine blades in a gas turbine). The result is a two-phase jet with high kinetic energy.

The two-phase jet is directed tangentially on the inner surface of the drum-shaped rotary separator. The separator rotates at a speed close to that of the jet so there is very little friction loss and the liquid kinetic energy remains high. The high centrifugal acceleration forces the heavier liquid to the wall resulting in a clean separation from the gas.

Under the action of the centrifugal acceleration, the .liquid flows radially outward. The pressure is increased by the rotation of the liquid column. At the outer radius the liquid is expanded through a liquid nozzle to the casing pressure. The resulting liquid jets produce a reaction force which provides the torque to drive the load.

The liquid jets leaving the rotor have some residual kinetic energy which can be converted to pressure in a diffuser.

Other turbine geometries have been developed. Liquid impulse turbines and liquid drag turbines have been successfully used. For some applications where the energy content of the gas phase is high, gas blading has been incorporated into the rotor to increase the power output. The final choice of BRST geometry depends on the application requirements.

We claim:

1. A method for the recovery of volatile organic components (VOC) from a hydrocarbon stream containing the same comprising a) capturing a VOC-containing gas being released from a main hydrocarbon stream;

b) compressing the VOC-containing gas;

c) injecting the compressed VOC-containing gas into a sidestream taken from the main hydrocarbon stream and conducting the sidestream and compressed VOC-containing gas to a VOC recovery unit, wherein the unit consists essentially of a biphase rotary separator turbine (BRST);

d) in the VOC-recovery unit, separating out an inert gas component and a VOC-enriched liquid stream, venting the inert gas component into atmosphere and depressurizing the VOC-enriched liquid stream for reintroduction into the main hydrocarbon stream.

2. The method of claim 1 wherein the VOC-recovery unit further consists of a gas/liquid contactor.

3. The method of claim 2 wherein the gas/liquid contactor is a static mixer.

* * * * *